United States Patent
Van Oosterwijck et al.

(10) Patent No.: US 7,949,747 B1
(45) Date of Patent: May 24, 2011

(54) METHOD AND SYSTEM OF COMMUNICATION IN A WIRELESS WATER TREATMENT SYSTEM

(75) Inventors: Patrick Van Oosterwijck, Cottage Grove, MN (US); Jeffrey A. Zimmerman, Forest Lake, MN (US)

(73) Assignee: EcoWater Systems LLC, Woodbury, MN (US)

( * ) Notice: Subject to any disclaimer, the term of this patent is extended or adjusted under 35 U.S.C. 154(b) by 918 days.

(21) Appl. No.: 11/841,571

(22) Filed: Aug. 20, 2007

Related U.S. Application Data

(60) Provisional application No. 60/838,629, filed on Aug. 18, 2006.

(51) Int. Cl.
G06F 15/173 (2006.01)
G06F 15/16 (2006.01)
G08C 17/00 (2006.01)
H04H 20/71 (2008.01)

(52) U.S. Cl. ........ 709/224; 709/217; 709/218; 370/311; 370/312

(58) Field of Classification Search .......... 709/223–225, 709/231–232, 245, 217–218; 370/311–319; 455/404.1
See application file for complete search history.

(56) References Cited

U.S. PATENT DOCUMENTS

| | | | |
|---|---|---|---|
| 5,342,510 A | 8/1994 | Eden et al. | |
| 5,774,529 A | 6/1998 | Johannsen et al. | |
| 5,779,911 A | 7/1998 | Haug et al. | |
| 6,035,240 A | 3/2000 | Moorehead et al. | |
| 6,456,202 B2 | 9/2002 | Johannsen et al. | |
| 6,609,070 B1 | 8/2003 | Lueck | |
| 6,671,525 B2 * | 12/2003 | Allen et al. | 455/574 |
| 6,696,963 B2 | 2/2004 | Zimmerman et al. | |
| 6,826,267 B2 | 11/2004 | Daum et al. | |
| 6,954,701 B2 * | 10/2005 | Wolfe | 702/22 |
| 6,958,693 B2 | 10/2005 | Rothgeb et al. | |
| 7,030,768 B2 | 4/2006 | Wanie | |
| 7,053,767 B2 | 5/2006 | Petite et al. | |
| 7,146,429 B2 * | 12/2006 | Michel | 709/238 |
| 7,403,914 B2 * | 7/2008 | Janakiraman et al. | 705/26 |
| 7,433,942 B2 * | 10/2008 | Butt et al. | 709/223 |
| 7,583,625 B2 * | 9/2009 | Bennett | 370/313 |
| 7,724,671 B2 * | 5/2010 | Midtun et al. | 370/236 |
| 7,787,403 B2 * | 8/2010 | Winterton | 370/311 |
| 2003/0135629 A1 * | 7/2003 | Sasaki et al. | 709/229 |
| 2005/0043620 A1 * | 2/2005 | Fallows et al. | 600/437 |
| 2005/0138176 A1 * | 6/2005 | Singh et al. | 709/226 |
| 2006/0020686 A1 * | 1/2006 | Liss et al. | 709/219 |
| 2006/0056456 A1 * | 3/2006 | Ratiu et al. | 370/474 |

(Continued)

*Primary Examiner* — William Trost, IV
*Assistant Examiner* — Catherine Thiaw
(74) *Attorney, Agent, or Firm* — IpHorgan Ltd.

(57) ABSTRACT

A method of communication within a network of a water treatment system is disclosed. The water treatment system includes a plurality of devices. The devices including at least one AC powered device. The method comprising the steps of continually checking, by a first AC powered device, the network for broadcasts by other devices, detecting, by the first AC powered device, a broadcast by another device, establishing, by the first AC powered device, a logical connection with the other device, receiving, by the first AC powered device, any request by the other device for data, the request including the identification of a data element, and the address of the device which relates to the data element, and receiving, by the first AC powered device, any data offered by the other device, the data including the identification of a data element, the data element value, and the identification of the device which originated the data element value.

30 Claims, 7 Drawing Sheets

U.S. PATENT DOCUMENTS

| | | |
|---|---|---|
| 2006/0098604 A1* | 5/2006 | Flammer et al. ............... 370/337 |
| 2006/0128349 A1* | 6/2006 | Yoon .......................... 455/343.2 |
| 2006/0146733 A1* | 7/2006 | Alicherry et al. ............ 370/255 |
| 2007/0053308 A1* | 3/2007 | DuMas et al. ................ 370/254 |
| 2007/0067447 A1* | 3/2007 | Wong et al. .................. 709/224 |
| 2007/0076600 A1* | 4/2007 | Ekl et al. ....................... 370/229 |
| 2007/0119759 A1* | 5/2007 | Duplessis et al. ................ 210/85 |
| 2007/0198675 A1* | 8/2007 | Amanuddin et al. ......... 709/223 |
| 2007/0266117 A1* | 11/2007 | Pomies et al. ................ 709/218 |
| 2008/0219210 A1* | 9/2008 | Shuey et al. .................. 370/329 |
| 2008/0232286 A1* | 9/2008 | Habetha et al. ............... 370/311 |
| 2009/0238153 A1* | 9/2009 | Sim .............................. 370/336 |

* cited by examiner

METHOD AND SYSTEM OF COMMUNICATION IN A WIRELESS WATER TREATMENT SYSTEM

CROSS-REFERENCE TO RELATED APPLICATION

This application claims the benefit of U.S. provisional patent application No. 60/838,629, filed Aug. 18, 2006.

FIELD OF THE INVENTION

The invention relates, generally, to water treatment systems and, in particular, to a method and system of communication in a wireless water softener system, the system including an optional remote device.

BACKGROUND OF THE INVENTION

U.S. Pat. No. 6,456,202, which issued to Johannsen et al., and U.S. Pat. No. 6,696,963, which issued to Zimmerman et al., are incorporated herein by reference. Zimmerman et al. discloses a water softener and system for monitoring the status of the water softener. A controller at the water softener anticipates salt depletion. The water softener may include a remote unit having a display panel. Status information may be provided to a remote location via the remote unit. The status information is transmitted from the controller via a transmitter. The remote device includes a receiver to receive the status information. U.S. Pat. No. 5,774,529, which issued to Johannsen et al., is also incorporated herein by reference, and discloses a similar system wherein the operating conditions of the water softener are transmitted via a telephone system.

SUMMARY OF THE INVENTION

The present invention provides in one embodiment a system of communication within a network of a water treatment system, the water treatment system may include a water softener, a reverse osmosis (RO) system, and other water treatment devices or appliances, including a UV filter, an ozonation system, and a chemical feed system. The system may further include other home appliances, such as a washing machine, a dryer, a refrigerator, and oven, as well as other devices. Certain of the associated communication devices may be AC powered and other devices may be battery powered devices.

In one embodiment, the present invention provides a method of communication within a network of a water treatment system, the water treatment system including a plurality of devices, the devices including at least one AC powered device. The method includes the steps of continually checking, by a first AC powered device, the network for broadcasts by other devices, detecting, by the first AC powered device, a broadcast by another device, establishing, by the first AC powered device, a logical connection with the other device, receiving, by the first AC powered device, any request by the other device for data, the request including the identification of a data element, and the address of the device which relates to the data element, and receiving, by the first AC powered device, any data offered by the other device, the data including the identification of a data element, the data element value, and the identification of the device which originated the data element value.

The present invention provides in one embodiment a water softener wireless remote monitor and controller. The device is capable of monitoring and controlling multiple water treatment devices, including a softener and a RO system. The device monitors the status of the water treatment system and displays a readout of the softener's performance, giving positive feedback to the user. Other status information includes: filter life, salt level, and status of other home appliances. This same device has the ability to control the softener, such as: regenerate tonight, change efficiency mode, and regenerate now. The wireless remote unit may be dedicated to displaying the status of a water softener, or it may be capable of displaying the status of other home appliances. Accordingly, the wireless unit may be capable of receiving status information for a plurality of devices, each associated with a separate home appliance. The wireless remote radio transceiver may scan a range of radio frequencies to obtain status information for the multiple transmitting appliances. Alternatively, the transmitting appliances may share radio frequencies using TDMA or CDMA techniques to transmit data to the remote receiver.

In one embodiment, the remote device includes an antenna, a radio frequency transceiver coupled to the antenna, a controller coupled to the transceiver, a user interface and display coupled to the controller, and battery terminals for receiving a battery to power the remote unit. Alternatively, the remote unit may include a power converter for coupling to a power line.

A wireless protocol is also disclosed for providing a means of communication between devices. The protocol is also adaptable for other applications.

Instead of setting up links between specific source and destination devices, the protocol system works using loosely coupled data exchange and is based on "gossip" (e.g., the system nick name GrapeVine) between the devices that will spread the latest data throughout the network. Devices share certain data elements with the network and remotes are set up to request those data elements from the network. Every data element has an associated "lifetime" in the network, when devices talk to each other, the most up-to-date copy of the data will end up in both so it can be shared with whatever device requires the data. This way fresh data propagates through the network using only simple device-to-device communication without using complicated routing systems.

A distinction is made in the operation of AC powered devices (e.g., water softener system, whole home filters, etc.) and battery powered devices (e.g., remote devices, RO systems). AC powered devices will listen for data exchange all the time and act as data caching hubs in the network. Battery powered devices don't talk to each other directly, they have to wake up regularly to go and talk to any AC powered device in the network, either to update their information that is shared in the network, or in case of the remote, to get updated data from the network, or provide data. This implies that at least one AC powered device has to be part of the network, a battery powered RO and remote cannot communicate directly.

Using the lifetime associated with data elements, data delivery does not have to be perfect and the remote can continue to provide useful data to the user as long as its data is deemed "fresh enough". For some types of data, this can be a day, other types of data require a more frequent updating. Data exchanges will be limited if slow changing data is shared, this helps improve remote battery life.

DETAILED DESCRIPTION OF THE INVENTION

Figure 1:
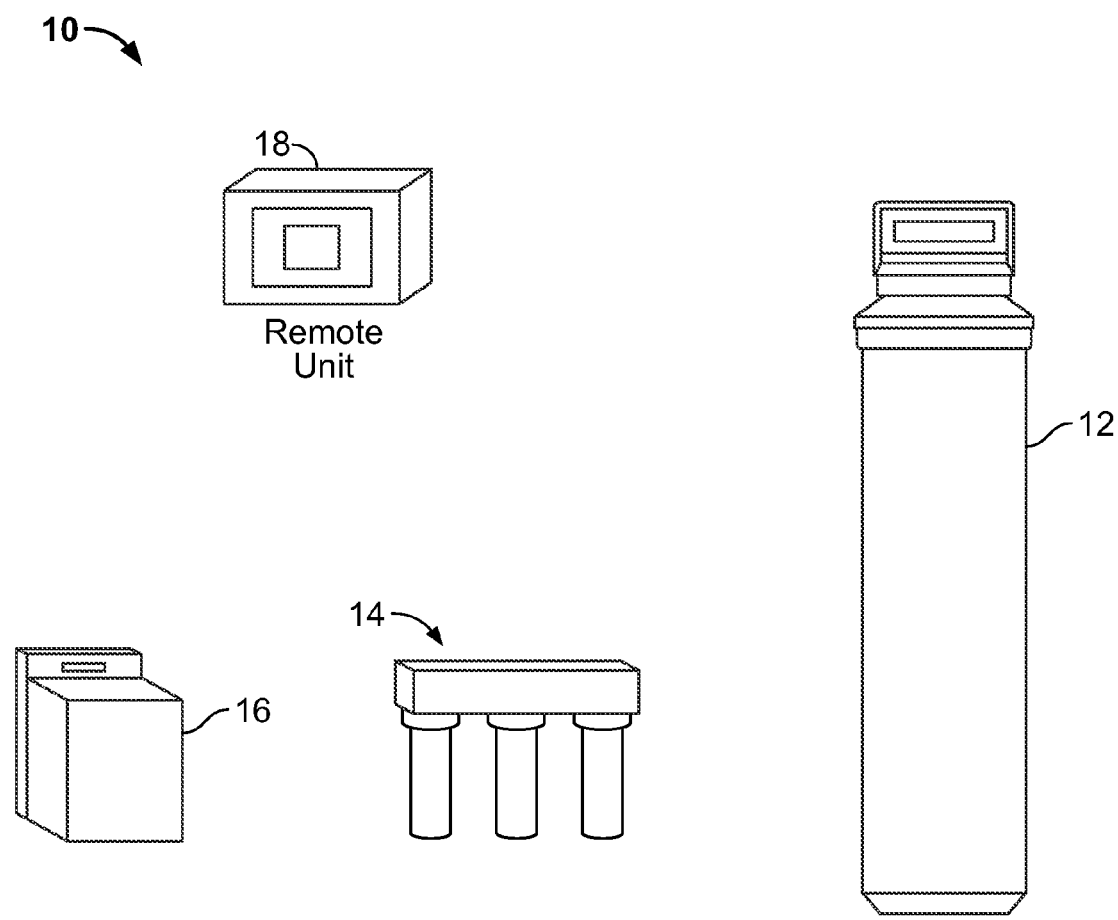
FIG. 1 is a perspective view of a water treatment and home appliance system in accordance with the present invention.
Figure 2:
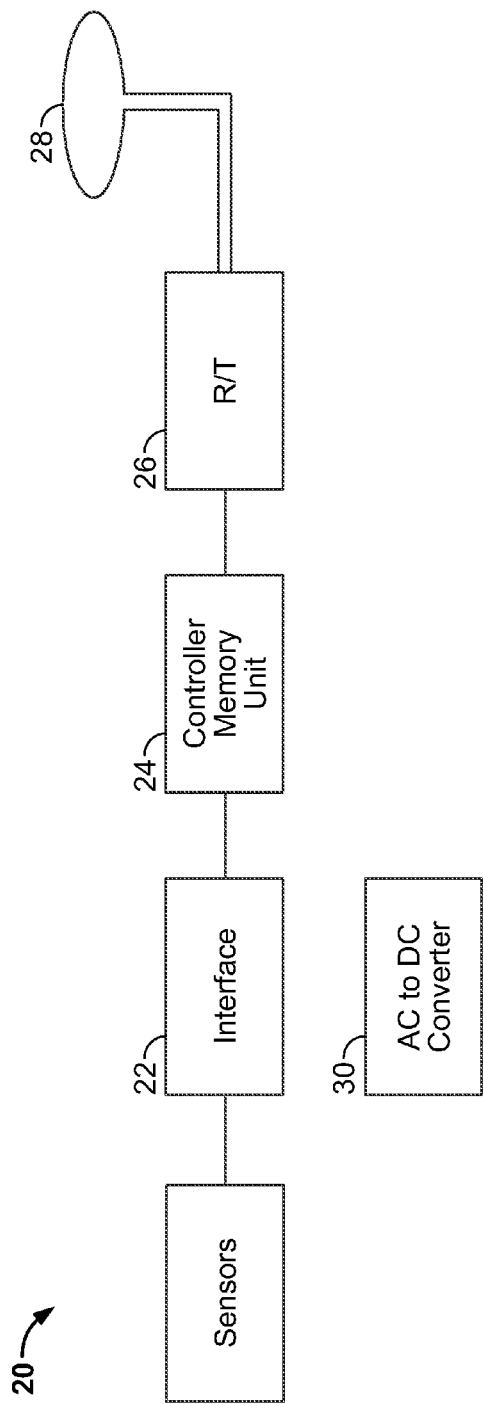
FIG. 2 is a functional block diagram of an AC powered device for a water softener.

FIG. 1 shows one embodiment of the system 10 of the present invention having a water softener 12, a reverse osmosis (OS) system 14, a home appliance 16 and a remote device 18. While the disclosed embodiment relates particularly to a household water treatment and other home appliance embodiment, it will be appreciated that the invention may be implemented in other applications. The water softener 12 and remote device 18 may include many of the components and features of the water softener and remote device shown in previously noted Zimmerman et al. FIG. 2 shows a block diagram of the data communication device 20 of the water softener. The data communication device 20 includes an interface 22 coupled to various sensors of the water softener 12 such as is known in the art such as show, for example, in Zimmerman et al. The interface 22 is coupled to a controller and memory unit 24. The controller and memory unit 24 are shown as a single unit for convenience, but it will be appreciated that the controller and memory may be separate physical units. For example, the controller portion of the unit 24 may be implemented with a NEC uPD78F0537GC. The memory includes a program under control of the controller. The program for each unit is described in further detail below. The unit 24 is coupled to a transceiver 26 which in turn is coupled to an antenna 28. The transceiver 26 may be implemented with the Integration Associates IA4420 chip. The device 20 is coupled to an AC power source and thus includes an AC-to-DC power converter and interface 30. Thus, the device 20 shown in FIG. 2 is considered herein to be AC powered. FIG. 2 is also representative of the block diagram of other AC powered devices such as certain home appliance devices 16.

Figure 3:
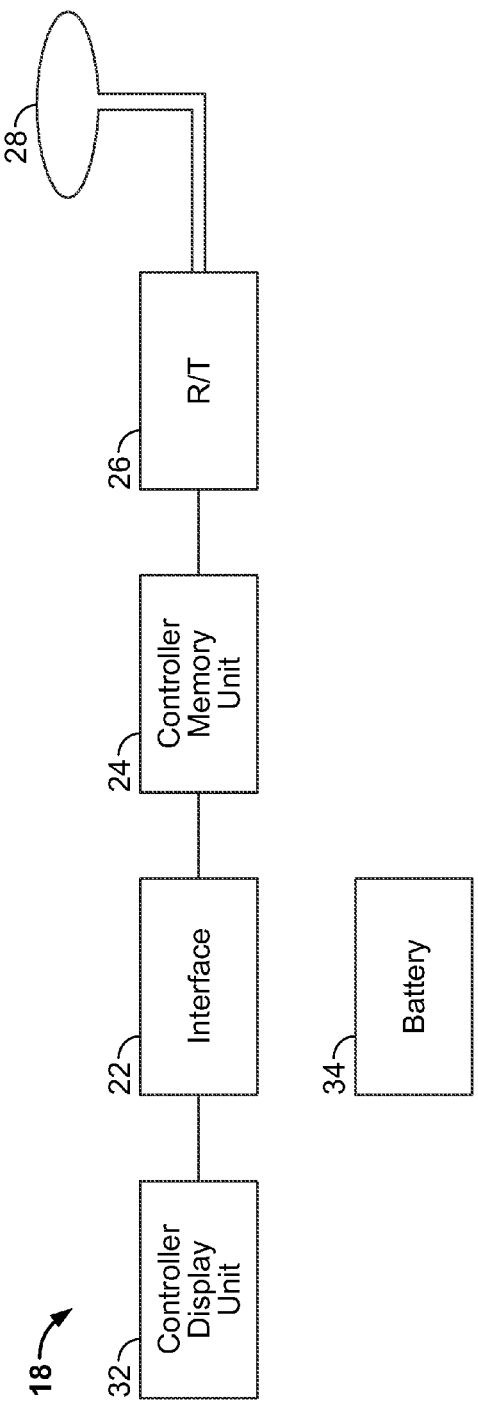
FIG. 3 is a functional block diagram of a battery powered device for a remote unit or device.

FIG. 3 shows the block diagram of the remote device 18 and also includes an interface 22 coupled to the controller and memory unit 24 which is coupled to the transceiver 26 which is coupled to the antenna 28. The interface 22 is coupled to a control and display unit 32. The control and display unit 32 includes a user interface and a display. The controller portion of the unit 24 in the remote device 18 may be implemented with a TI MSP430F1491. The remote device 18 may be battery powered and thus is shown to include a battery and battery interface 34. However, the remote device 19 may also be implemented as an AC powered device, in the alternative. FIG. 3 is also representative of the battery operated RO system 14. Hereto, the RO system may in the alternative be AC powered.

The GrapeVine network is a system that was created to provide a flexible and extendible platform for RF communication between water treatment appliances and a remote monitor and controller.

The system was set up from the start in such a way that future devices could be made compatible with the remote without having to know their details at the time the remote was shipped. Another consideration was that the network would have to be designed for low power consumption since the remote would be battery powered. Slow data update rates and a limited number of devices in network were design constraints set from the start to achieve this goal. Battery operation plus the desire to limit cost caused the system to be designed to only show the most pertinent information on the remote. The ability to extend the range by adding repeaters was also an important factor in designing the network.

The system that was designed based on these requirements is described in this document. The code was developed to be largely portable with few hooks needed in the application software for device specific code. This way it should be easy to add GrapeVine network capability to other devices in the future.

The main benefits and features of the system include a small software footprint (~6 kB code, depending on implementation and not including data link layer and data structures), compatible with cost-effective physical layer implementations, low power consumption on battery powered devices since the bulk of information is sent during setup and only minimal data packets are sent in normal operation, data propagation system is designed for maximum availability of the most up-to-date data, signal strength indication indicates the weakest link in the path the data travels from its source to the eventual destination where it is displayed.

Data Structures and Organization

The data is structured in such a way that the bulk of data gets sent back and forth when a device is included on the remote, after that a minimal amount of data is passed around the network. The initial setup is between the device and remote only, no caching or repeating is necessary. Caching and repeating is only used to pass data around once the device is added to the remote.

Figure 4:
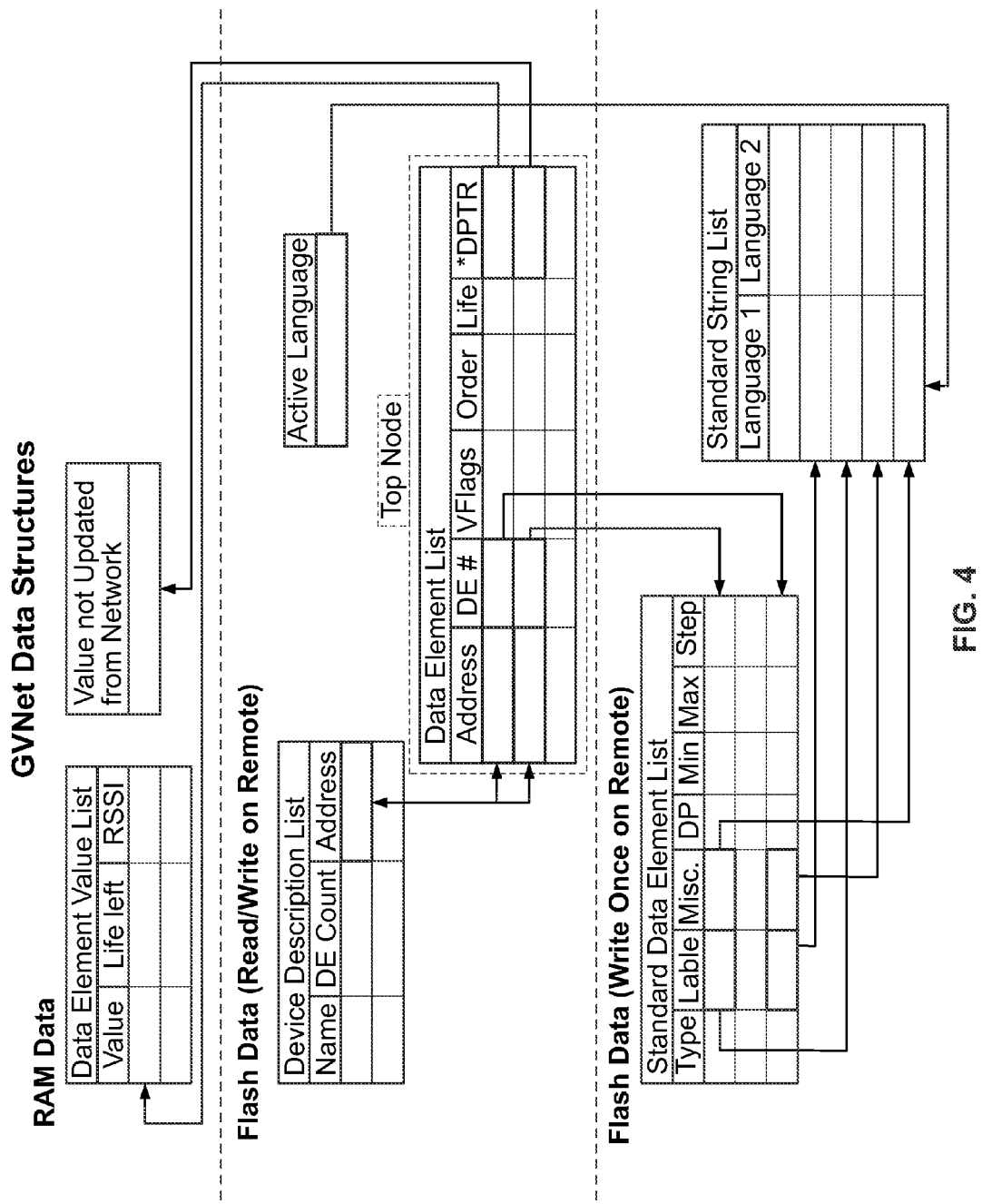
FIG. 4 shows a diagram of how the different structures are linked.

The data is organized in different structures according to how it gets stored, how often it changes and if it has to be non-volatile. The diagram in FIG. 4 gives a rough sketch of how the different structures are linked.

The data is organized similar to a database made up of tables that link to other tables. In both AC and battery powered devices, the data structures stored in flash are read-only. Only data element values, and their associated metadata, change and reside in RAM. In the remote on the other hand, all data structures can change with different degrees of frequency. Data element values that change continuously reside in RAM. The device description list and data element list reside in Flash and entries are added and removed when a device is added to the remote or when one is deleted. Changing settings like view flags and display order makes changes to entries in the data element list structure. The reason to have these structures in Flash memory is that they have to be non-volatile so the user doesn't loose all devices and settings on the remote when they change batteries. The standard data element list and standard string list can be considered read-only, but these lists can be extended for future devices that add more data elements and accompanying strings. Only switching languages after strings have been added will cause added entries to be erased from these lists. If the user never switches languages after initial setup, no list entries will ever be erased.

Data Element Definitions

Each piece of information the remote gets from devices in the network is called a data element. Each data element has the following properties that describe how it should be displayed:

| Property | Description |
| --- | --- |
| ID | Number to uniquely identify the data element |
| Type | Number (8, 16, 32 bit signed or unsigned), time span, time of day, alert, enumerated item selection |
| Label | String displayed on screen to describe data |
| Unit/Item list | String displayed for data unit, or enumeration of selection list strings |
| Decimal point position | Only for number type, digits behind decimal point |
| Minimum | Minimum value |
| Maximum | Maximum value, or number of items in selection list |
| Step size | Step size for setting values |

Example: The data element properties are:

| Property | Value |
| --- | --- |
| ID | 0 × 05 |
| Type | Number |
| Label | Filter time remaining |
| Unit/Item list | days |
| Decimal point position | 0 |
| Minimum | 0 |
| Maximum | 730 |
| Step size | 1 |

And the unit reports: ID 0×05=10

| | | |
| --- | --- | --- |
| Would display: | Filter time remaining | 10 days |

The remote contains the definition of all data elements it knows at the time it is shipped. If later a new device requires new data elements that the remote doesn't know, the remote will request them from the new device and update its internal list of data element definitions. A company standard data element list and text string list that determines the unique meaning of each of the data element ID's and string ID's will need to be maintained, so that there will never be any confusion over the meaning of a specific data element ID or string ID.

Data Element List Entry

When a device is added to a remote, it tells the remote which data elements it shares, which of them should show on the remote by default and can be remotely controlled by default, which of these defaults can be changed, and in what order they should be shown on the remote display. All of this is defined in the data element list entry structure:

| Property | Description |
| --- | --- |
| Device address | Device the data element belongs to |
| Data element ID | Refers to the data element definition |
| View flags | Flags that indicate if the data element will show by default, if it is remotely controllable, and if these defaults can be changed on the remote |
| Life | The lifetime of the data element in the network before it expires |
| Data pointer | Points to the data element value structure that will keep track of the actual data during operation |
| Display order | 1-based order number, determines the order in which the data elements will show on the remote |

Once this structure is stored on the remote, it can be changed from the remote's user interface to tune the settings to the users wishes. Therefore, unlike the data element definition, which is set in stone, this structure is specific to the device and changeable.

The data element list entry is the top node of the data structure. All "queries" start from this list: the program can find all data elements for a device by comparing addresses to those in the device description list, data element values can be reached through the data pointer, data life can be evaluated by comparing current data element value life to maximum life, data element definitions are referenced through their standard data element ID's and from there, all necessary strings can be reached using their string ID's.

Data Element Value

The actual data passed back and forth is contained in a data element value structure:

| Property | Description |
| --- | --- |
| Value | The actual data element value, can be 8, 16 or 32 bit, signed or unsigned |
| Life left | Keep track of the lifetime of the data element |
| RSSI | Receive signal strength indicator, indicates the signal strength of the weakest link the data traveled |

Any piece of data in the network uses this structure. The structure contains the actual data element value plus metadata that track data element life and signal strength. With the included metadata, devices can keep track of the freshness and quality of the data they have, and they are used in the algorithms that decide what data needs to be updated.

The "Life left" property has two parts to it. The lower 15 bits contain the life in seconds, this allows for a maximum life of about 9 hours that can be used. The most significant bit is used as a "remote control" flag that is set for data element values that have been updated from a remote.

AC powered devices can get away with not using the full structure for data elements they only share with the network but are not remotely controllable. The "Life left" and "RSSI" fields of the structure are not used in that case, so only the data element value itself it needed. Remotely controllable data elements and data elements on battery operated devices always have to use the full structure.

Languages

The remote has its own set of languages, which can be different from other devices' languages. If all data elements of a certain device are already known to the remote, there is no issue, the remote can show the data in the languages it supports. When including a new device that uses a data element using strings the remote doesn't know yet, the remote will ask for the associated strings in the language that is currently used on the remote. If the device can provide the strings, everything is fine and the data element will show on the remote. If the device cannot provide the strings in the requested language, the data element will be discarded and not show on the remote.

Strings received from devices are stored in a block of flash memory called the "string pool". References to the new string are added to the string list, so the string is used identical to one that was originally programmed in the remote. However, since only strings in the current language are requested, the user cannot switch to another language, as the added strings are not available in any other language. This is the reason that the remote deletes all devices when switching languages if strings have been added to the string pool. This allows the string pool to be cleared and the string list to be restored to its original state. After this, devices can be added again and the strings will be requested in the new language.

Units

Data elements carrying the same data in different units are treated as completely separate data elements. For instance, hardness in grains has a different data element definition and ID from hardness in PPM. This allows not only the use of different strings for the unit, but also the necessary changes in decimal point position, minimum and maximum values and step sizes that may be necessary to use the different unit.

All unit conversion is done by the device that shares the data element. It will just serve the variant that is requested by the remote, the remote will treat the different variants as totally unrelated pieces of data. During inclusion of a device on a remote, the device can decide which unit variant will show by default on the remote by setting and clearing view flags in the data element list entry structures it sends, based on its own settings.

Protocol

The central idea is that there is no routing of data, just data sharing. The data elements are considered common knowledge in the network. When a node has a new value for a data element, it doesn't matter who will eventually display the value. All that matters is that some node that is available for inquiries in the network knows, so it can be passed on to whoever asks for it. Likewise, when a node needs an update on the latest value of a data element, it doesn't matter who in the network has it, as long as there is at least one node that does.

Protocol Basics for Ac and Battery Powered Devices

For AC powered devices, the situation is simple. Since they are always on, they can always listen for requests about their data elements, and respond by providing the requested information. The only support they need to get from the network is that other AC powered nodes can cache their data elements if they have seen a request for them. Battery powered devices don't have the luxury of being awake to answer requests of other nodes. So what they have to do is wake up, talk to any AC powered node in the network and provide new information it has, request any information it may want, and go back to sleep. If another node wants information from the battery powered node, it will have to get it from the AC powered nodes that have received and shared the information.

Network Messages

Since the goal is to make information available in the network, it is to our advantage if as many nodes as possible can provide the information another node may need. Since we will only have a small amount of nodes and battery operated nodes will only provide a small amount of information, we can treat all communication as broadcasts and do not need to specify a destination. In principle, the destination is "the network" and any node can tap in to it to share or request information.

Because no destination address is used, network messages need to contain the address of the source node, the address of the device the data element belongs to, and the ID of the data element that is transmitted. The addresses of devices have to be unique and can be derived from their serial number or are entered during manufacturing.

Network messages are constructed by taking any network structure and putting a message header in front of it and a CRC16 behind it. The following table shows the content of the header:

| Property | Description |
| --- | --- |
| Message length | Length of the message including CRC16 |
| Version | Protocol version number, currently version 1 |
| Source address | Source address of device originating this message |
| Device address | Address of device that the message is about |
| Index | Data element, string or other index this message is about |
| Message type | Message type code, indicates what sort of message it is and which network structure it contains |

Data and Request Lifetimes

When devices may be able to talk to some devices but not to others, data may spread through the network in weird ways. To prevent problems with old data overwriting newer data, all data and requests that travel through the network have lifetimes associated with them. This lifetime system is the core of maintaining data integrity in the GrapeVine network.

When a new piece of data or a new request is transmitted, it will have its lifetime set to maximum (maximum lifetime can be different for all data elements). While traveling through the network and after arriving in the remote, the life of the data element will continually be decreased. When receiving data or requests, "fresher" pieces of information (those with more life left) will overwrite older ones. This way, devices will always retain and share the most recent information, or if lifetimes are identical, the information that arrived with the highest signal quality.

The following describes lifetime rules for different devices: 1) Lifetimes are maintained in seconds to ensure reliable delivery of "remote control" data elements (see Remote control section); 2) Remotes keep track of data element lifetimes to determine when they will go out and talk to the network to get updated information. If any data element gets down to ¼ of its maximum lifetime, the remote will take the initiative to communicate with the network. Once the remote has decided to communicate, it will request updates for all data elements that have less than ½ their lifetime left. Only when the user forces an update by pressing a button will all data elements be updated, regardless of their life left.

Remotes have to decrease lifetimes for all data elements, but can do this at a sloppy pace (current implementation is every 15 seconds; 3) AC powered devices have to decrease the lifetimes of the requests and data in their caches every second to ensure proper delivery of "remote control" data elements. Because of these lifetimes tracked in the caches, data that sits in the network will age the same as data in the battery powered devices where it originated, or data that is displayed on remotes. Remotely controllable data elements in AC powered devices will have their lifetime tracked to enforce consistency when their value is changed both locally and remotely. Because their lifetime will be set to maximum, both when transmitted by the remote and when set locally, and age simultaneously, the one that was set last will be the one that (eventually) wins, regardless of any delays while traveling through the network. AC powered devices do not need to track the lifetimes or their own data elements that are not remotely controllable. Therefore, the complete data element value structure does not need to be used for non remote controllable data; 4) Battery powered devices use the lifetimes of their data elements to track how long it has been since an update has been sent to the network. Lifetimes have to be tracked for all data elements, but they can be decreased at a sloppy pace (doesn't need to be every second).

When the lifetime of any data element reaches ¼ of its maximum value, the battery operated device will take the initiative to go out and talk to the network so other devices in the network can request the data they need. If a piece of data gets requested and sent out by the battery powered device, the data element's lifetime gets set to maximum so its life in the network can be tracked. If a data element never gets requested, its life will eventually reach zero. At this point, it will not be considered anymore when deciding to wake up and talk to the network, since nobody seems to be interested in it. This prevents unnecessary communication because of unwanted data. A side effect of this policy is that a battery powered device may not wake up to talk to the network at all after not getting any requests for a long time. This could happen when an extended power outage occurs for instance. To solve this issue, battery powered devices will need to have a mechanism to force them to go out and talk to the network. The implementation for this is device specific and can include timers or user activation.

Device Setup

Setup is only a matter between the device that is included on the remote, and the remote it is added to. No other devices need to be involved and no caching or repeating of setup info is done. The remote will be brought in a listening state and the device to be included will be made to send an announcement message. On receiving this, the remote will start to ask the device for its data element list.

If the data element list refers to any data elements the remote doesn't have a definition for, it will ask for the data element definition and any unknown strings that may be associated with it. If the device cannot provide these, the data element will be ignored. The remote will show only data elements that it has complete information for and report that the added device is incomplete if it cannot provide all needed info.

Caching

AC powered devices contain a data element cache that is an array of cache entries with the following structure:

| Property | Description |
| --- | --- |
| Device address | Address of device the data element belongs to |
| Data element | Data element that is cached |
| | Request |
| Life left | Data element request life left in seconds |
| | Data value |
| Value | The actual data element value, can be 8, 16 or 32 bit, signed or unsigned |
| Life left | Data element value life left in seconds in lower 15 bits, remote control flag in most significant bit |
| RSSI | Receive signal strength indicator, indicates the signal strength of the weakest link the data traveled |

When a remote decides its data needs an update (based on data element lifetimes, or triggered by the user), it will search out an AC powered device to request data from. If the AC powered device gets a request for one of its own data elements, it will just return the data with maximum lifetime. If the request is for another device's data element, the AC powered device will add the request to its cache if it isn't there yet, or refresh the request lifetime if it already has the request in its cache. If it already has a data element value associated with the request, it will return this value to the remote.

A battery powered device will regularly go out to the network to see if any of its data is needed. The AC powered device it ends up talking to, will pass on any data element requests it may have in its cache for the battery powered device, but will not ask for things that weren't requested by anyone. The battery operated device will provide the AC powered device with new data for the requested data elements.

Using this system, cache entries are only reserved for data elements that are actually wanted by a remote. If the user changes settings on the remote and turns off a certain data element, the AC powered devices in the network will not hear requests for it anymore and eventually the cache entry will expire when the request lifetime reaches zero. The cache entry is then available for other data elements. After the request expires, the AC powered device will no longer pass it to the target battery powered device or other AC powered devices. If the user enables the data element again at a later time, the request will be added to the AC powered devices' cache again and it will be requested it again from the device it belongs to. This way the system is self-managing the flow of data and keeping it to a minimum.

Gossip

Because not all AC powered devices may be in range of a remote, they have to pass on each others data elements, plus the data elements they are caching that another AC powered device may not hear. For this, a gossip sequence is used. After communicating with a battery powered device, and at regular intervals, the device will broadcast all its own data elements and active cache entries on all channels. If a request in the cache is fresher than the accompanying data, the request will be transmitted during gossip, otherwise the data will be transmitted. Gossip plus the request and data element lifetime system ensures that all AC powered devices in the network have the most up-to-date requests and data available most of the time.

Repeaters

AC powered repeaters that will cache requests and data elements can be added to the network without any hassle. Just turn them on and they will do their job, hearing requests for data and caching that data when they hear it. Since they don't have any data to show on a remote, they don't need to be explicitly included.

Signal Strength Indication

Every data element value that travels through the network has a Receive Signal Strength Indication (RSSI) value associated with it. When a data element leaves its source device, it will be sent out with maximum RSSI level. Any device that receives the data element packet will compare the RSSI level that is contained in the packet with the RSSI level with which it received the packet. The lowest RSSI level is the one that will be saved for future use, for instance, when sending the data element out to another device or for displaying RSSI levels. Every data element will eventually end up in the remote with an RSSI level that indicates the weakest link in the path the packet traveled to reach the remote. The remote will calculate the average of the RSSI values of all data elements belonging to a specific device and display this compound RSSI level on the device's signal strength screen.

Device Communication

Figure 5:
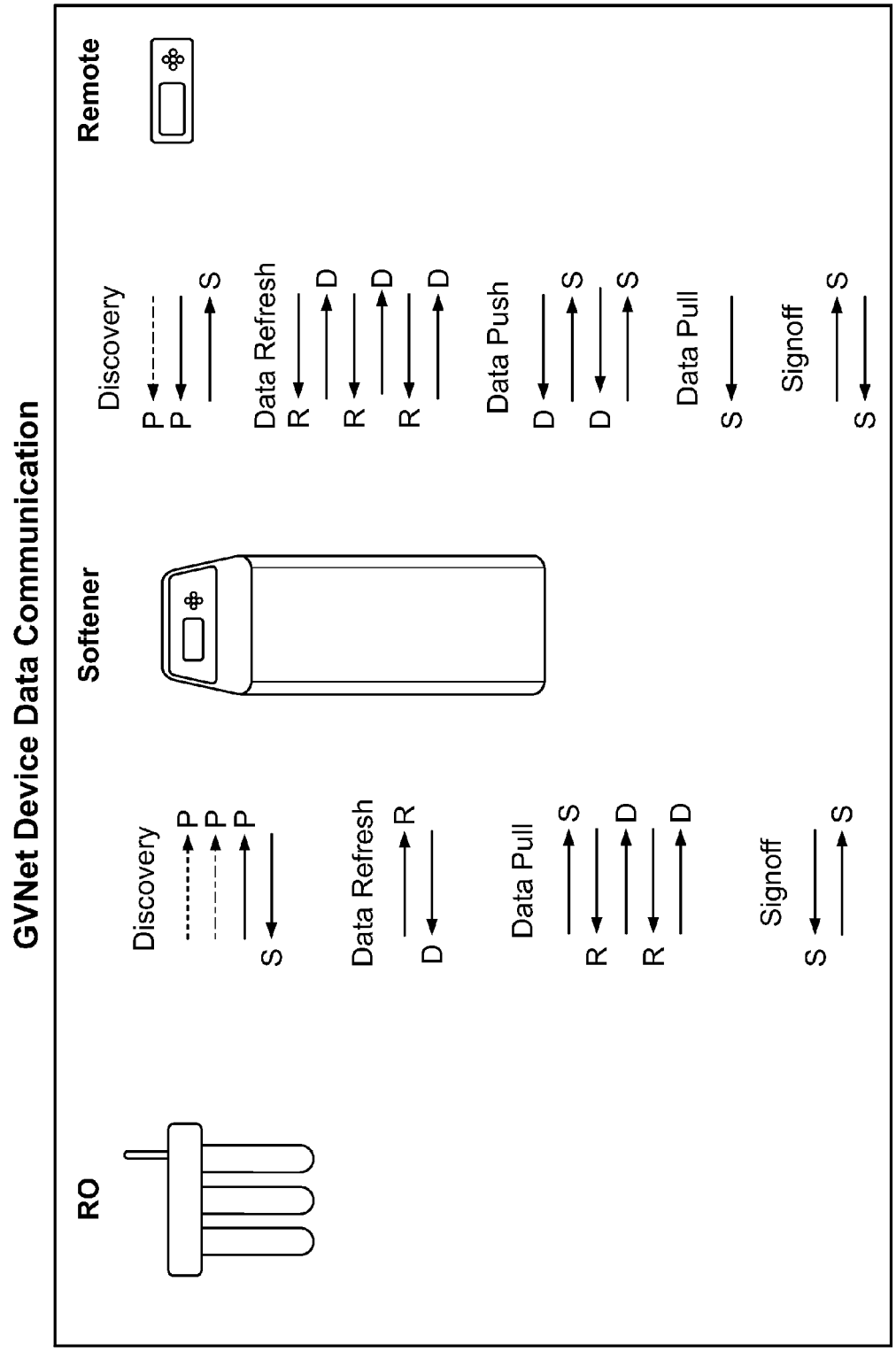
FIG. 5 shows that the typical communication between devices initiated from the battery powered devices and contains five phases.
Figure 8:
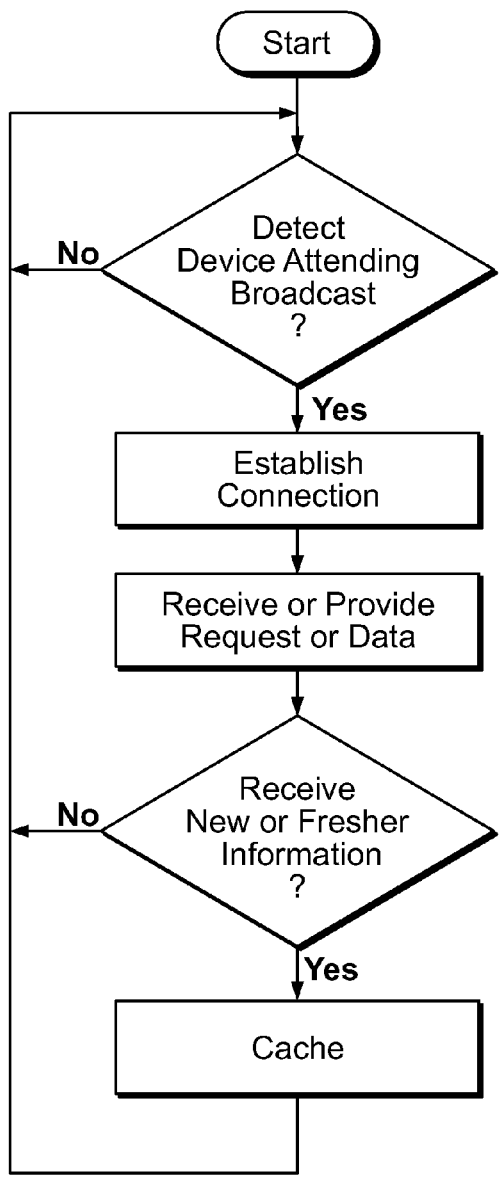
FIG. 8 is a flow chart of a typical routine of an AC powered device and a battery powered device.
Figure 8:
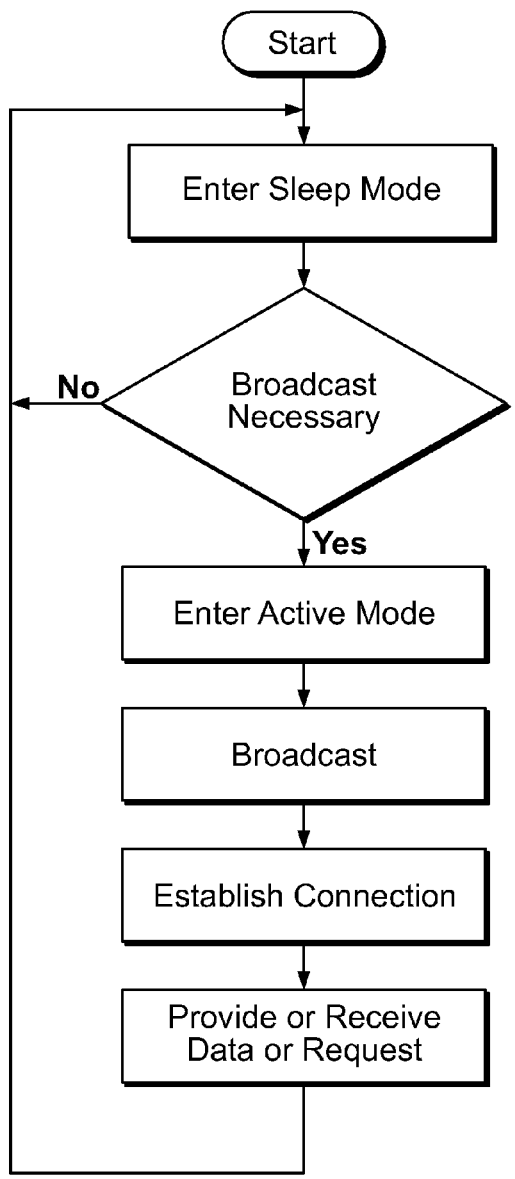

Referring to FIGS. 5 and 8, normal communication between devices is initiated from the battery powered devices and contains five phases: Discovery, Data Refresh, Data Push, Data Pull, and Signoff. These phases are carried out using four different message types: "Ping", "Sync", "data element value Request" and "Data element value". The phases are identical for remotes and battery operated devices, but some phases are immediately passed through if they are not relevant to the device. Because of this, AC powered devices do not need to know if they are talking to a remote or a battery powered device, which simplifies the protocol.

Discovery Phase

During this phase, the battery powered device will send out "Ping" messages on the different channels and listen for an answer. Before sending out a "Ping", the battery powered device will listen to make sure that the channel is clear. When an AC powered device hears a "Ping", it will first listen to see if anyone else replies, and if not, after a random delay it will send a "Sync" message to the battery powered device. At this point, a link is set up between the devices and they move on to the next phase. If the battery powered device doesn't hear the "Sync" response, it will keep sending out "Ping" messages on the different channels until it hears someone's response or until it runs out of retries.

Data Refresh Phase

The data refresh phase is mostly used by remotes to get updated information from the network, but battery powered devices use it if they have remotely controllable data elements to see if there was a remote update to those. During this phase, the battery powered device sends out "data element value Request" messages and the AC powered device replies with "Data element value" messages, or with an invalid index message in case it can't provide the requested data. This will occur if the requested data element doesn't belong to the AC powered device and it doesn't have the requested data element in its cache either.

Data Push Phase

The data push phase is only used by remotes to push remote control data to the network. The remote sends out, or "pushes", unrequested "Data element value" messages to the AC powered device. These will have the "remote control" flag set so AC powered devices will treat them differently in their cache so they can propagate to the target device. The AC powered device will acknowledge it received the data element value by sending a "Sync" message.

Data Pull Phase

Prior to the data pull phase, the battery powered device has taken the initiative in the conversation. For the data pull phase, the battery powered device starts by transferring the initiative to the AC powered device so it can request anything it might want. It does this by sending a "Sync" message. After this, the AC powered device starts to send "data element value Request" messages to the battery powered device, the battery powered device responds with "Data element value" messages, or invalid index if the requested data is not available. In practice, this will only happen when an AC powered device talks to a battery powered device that isn't a remote, because it will only ask for data it has cached requests for. When talking to a remote, it will not have any requests for it so it will immediately move on to Signoff.

Signoff Phase

When the AC powered device has requested all it wanted from the battery powered device, it will send a "Sync" message to indicate it is done. The battery powered device will send a "Sync" acknowledgement in return and the conversation is over. The battery powered device will go back to sleep and the AC powered device will start a gossip sequence to pass on any new information it may have received.

Setup Device Communication

Figure 6:
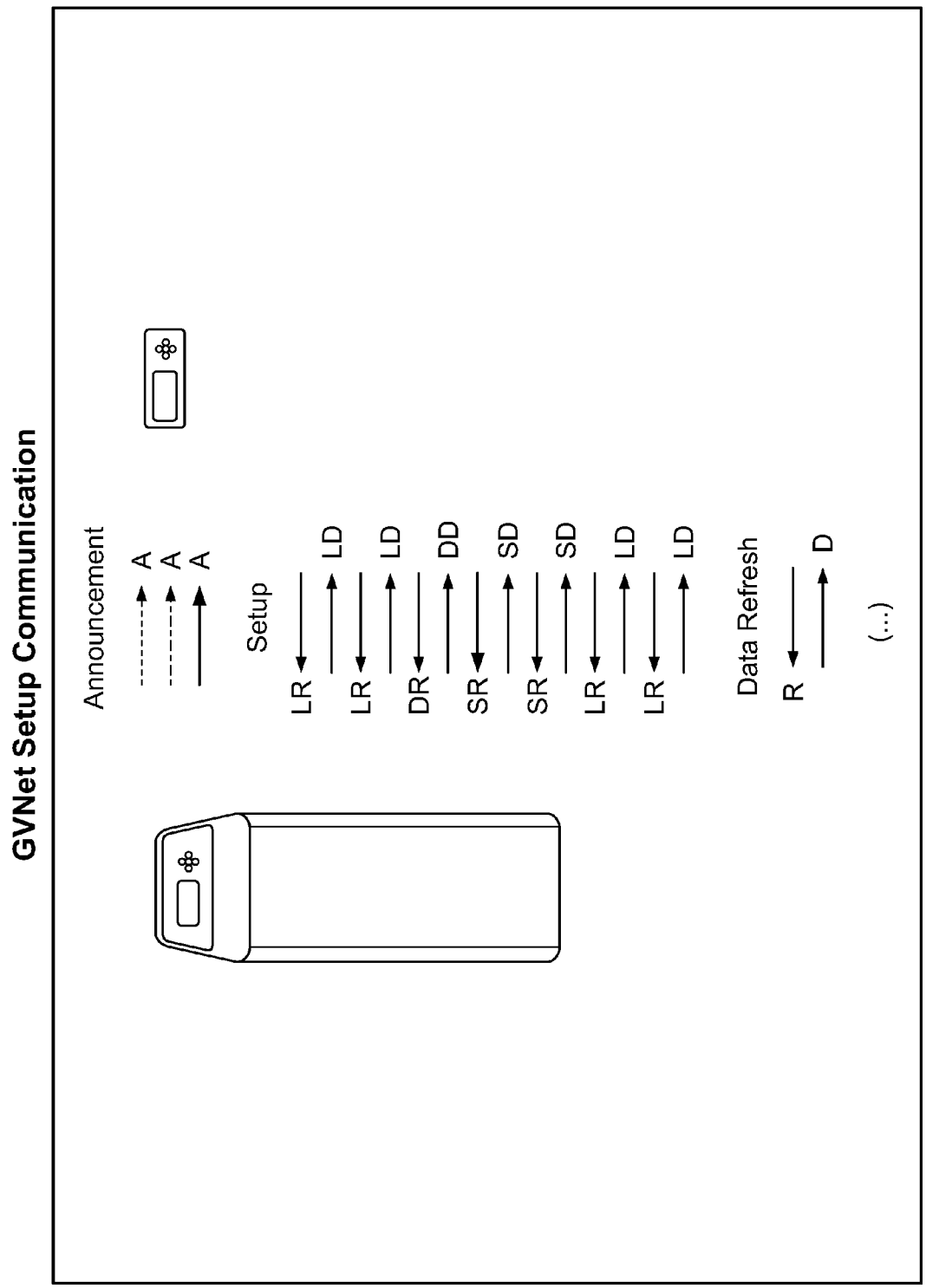
FIG. 6 shows the announcement and setup phases of the setup mode when a device is added to a remote unit or device.
Figure 7:
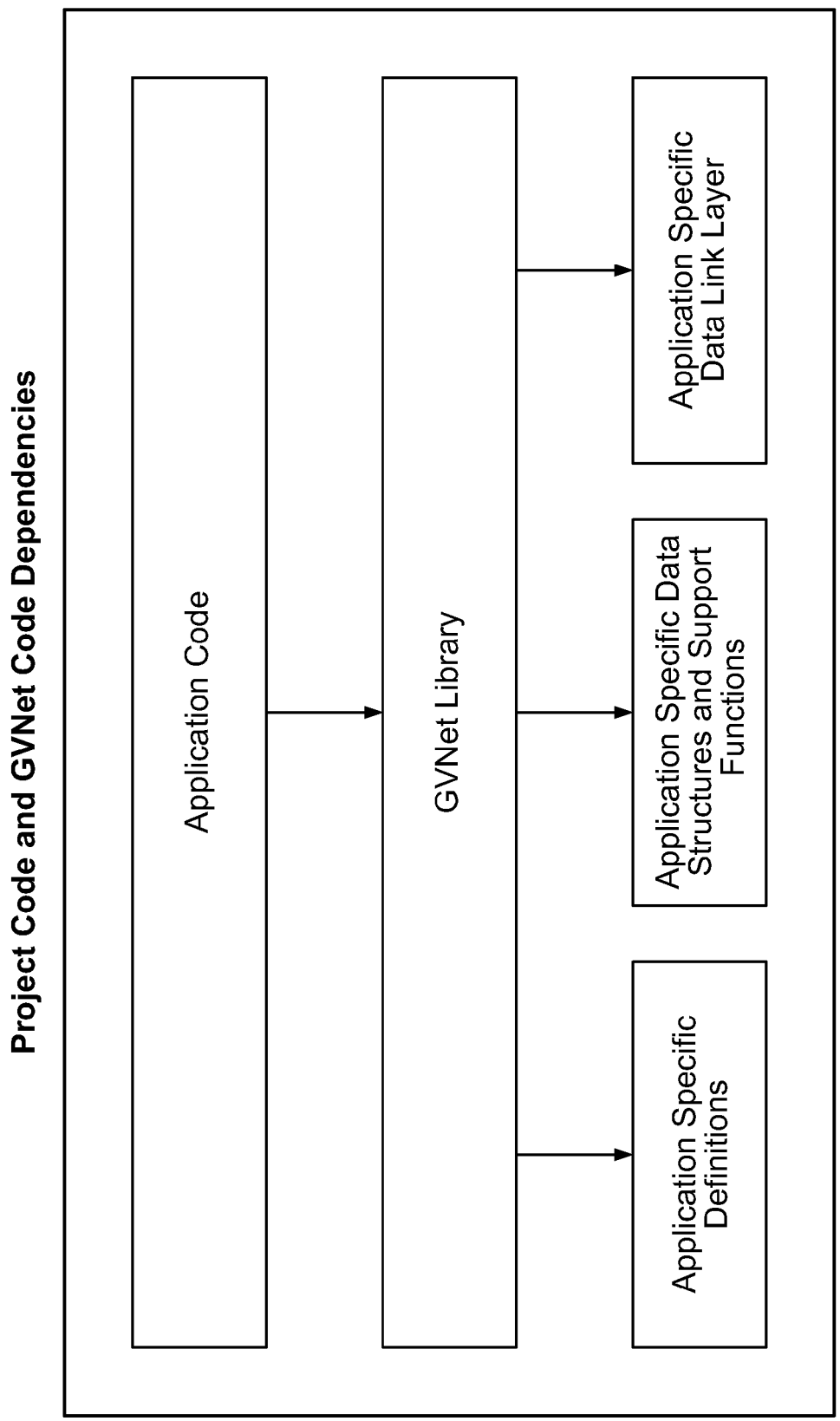
FIG. 7 depicts project codes and network codes.

Referring to FIG. 6, in setup mode, both the remote and the device that is added switch to a setup mode with different behavior, and normal communication is suspended until setup is done or a timeout occurs. Setup mode has two dedicated phases: Announcement and Setup.

Announcement Phase

During this phase, the remote is listening on every channel for a short time to see if anybody is transmitting announcement messages. The device meanwhile will be transmitting announcement messages on all channels. Announcement messages contain the device address, default device name and the number of data elements the device provides. When the remote hears one of the announcement messages, it switches to the Setup phase.

Setup Phase

After the announcement phase, the remote knows how many data elements the new device provides. In the following setup phase, the remote will send a "data element List Request" (LR) message for each data element. In response, the device will send a "Data element List entry" (LD) message that the remote will store in flash memory.

If the remote receives a "Data element List entry" (LD) message that references a data element it does not have a definition for, it will send a "data element Definition Request" (DR) for this data element. The device will respond with a "Data element Definition" (DD) message if it can provide it. If not, a "bad index" version of this message will be sent back instead.

The same happens in case the remote does not have a string that is referenced in the data element definition it received from the device. The remote will then send out a "String Request" (SR) message, and the device will respond with a "String Definition" (SD) message if it can provide the string in the current active language on the remote, or a "bad index" message if it cannot provide the string.

The software on the remote is set up in such a way that any data structure it receives during setup will only be written to flash once all the pieces of data it depends on are available. A string that defines enumeration choices will only be written once the strings it references are all available, a data element definition will only be written once all strings it references are available, and a data element list entry will only be written once the data element definition it references is available.

Because of limited memory in the remote, it does not keep track of all intermediate data structures it receives on the way to finding the deepest dependency. This means that every time it receives a dependency, it has to start over all the way from the "Data element List entry" (LD) and work though the tree again to find the next one, so the same request may be made multiple times in the process of moving through the dependency tree. This inefficiency only occurs during device setup where it can easily be tolerated, and the advantage is that RAM requirements on the remote can be relaxed.

Remote Control

The network supports remote control of data elements. Since the protocol is set up primarily to spread information from the device the data belongs to, special rules had to be created to allow flow of data in the other direction. Each device contains specific rules to make this work.

Remotes

When the user presses select to send a remotely controlled value, the lifetime of the data element gets set to its maximum lifetime, a "remote control" flag is set and an update event is raised. The "remote control" flag will be the upper bit of the 16-bit lifetime integer, the lifetime will occupy the lower 15 bits. The update event that was raised will force the protocol to run. When the protocol encounters a data element with "remote control" flag set, it will do a data push of this data element. After acknowledgement, the "remote control" flag is cleared and the lifetime is reset to a value that will give the remote control data time to propagate through the network, but will trigger the remote to go out to the network for an update fairly soon. This is set to one minute in the current implementation.

Cache Processing Rules

When a caching device receives a data element value with the "remote control" flag set (whether it comes directly from a remote or through gossip), it will create a new "remote control" entry in the cache for this data element if one doesn't exist yet. If one already exists, it will overwrite the existing one only if the new one has more lifetime left. This "remote control" entry is independent from any normal cache entry for the data element that may already exist in the cache. The data life of the "remote control" entry will be copied to the request life for the entry (without the "remote control" flag as the "remote control" flag is only used for data element values), which determines how long the "remote control" entry will stay in the cache. When the caching device gossips, it will gossip all active cache entries, normal and "remote control" entries alike. Since data life and request life are the same for "remote control" entries, the data is the one that will be sent out during gossip. No special mechanism to clear "remote control" cache entries will be used. Their life in the cache is determined by their lifetime, as is the case for normal cache entries. When a cached data element is requested, the normal (non-"remote control") cache entry is returned, except if the data element requested belongs to the device that is requesting it. In that case, the "remote control" entry is returned if there is one in the cache.

Target Device Processing Rules

When the target device receives a data element value with the "remote control" flag set, it will compare its life left to the current life it has left for this data element. If the life left of the incoming data element is higher, the new value will be accepted and a "data updated" flag will report the arrival of new data. The new data will have the "remote control" flag set, on dealing with the new value the device has to clear this flag. A target device will ignore incoming data elements that don't have the "remote control" flag set and incoming data elements that are not remotely controllable. Since this filtering is done in the target device, caching devices don't need to pay attention to the type of devices they are talking to. This allows the cache rules to be simplified since the rules to deliver data to remotes or other devices can be the same. Target devices have to set the data element life of remotely controllable data elements to maximum when they are updated locally. This will make sure the latest change will be applied whether it was done locally or remotely. Battery powered devices already use their local data element lifetimes to determine if they should go out and talk to the network, in effect keeping track of the freshness of their own data in the network. This should only be done however for data elements that are not remotely controllable, as remotely controllable data elements will use their lifetime to track remote updates instead. Remotely controllable data elements should not have their data element life reset to maximum when they are sent out, but only updated when they receive a local or remote update. Because of this, having a remotely controlled data element will cause battery powered devices to have to go out and talk to the network every minute (or another hardcoded timespan) to make sure remote control works in a timely manner.

Positioning the remote unit is critical. If the remote unit is positioned in an area which interferes with the signal from the water softener transmitter, or is placed too far away from the transmitter, the transmitted signal may not be strong enough for the remote unit to be able accurately receive the transmitted signal and, accordingly, may not be able to accurately display the current status of the water softener. Other factors may also come into play which effect the strength of the transmitting signal at the location of the remote unit.

In one embodiment, the remote unit includes the repeaters noted above. The remote device may further include a signal strength detector. In one embodiment, the display includes an analog signal strength meter. In another embodiment, the display includes a digital signal strength display. The digital signal strength display may comprise a plurality of bars, wherein each bar may be illuminated, depending on the strength of the signal. The greater the signal received, the greater the number of bars that are illuminated.

The signal strength meter may comprise a separate, dedicated component, or may comprise a region of an overall liquid crystal, cathode ray tube, plasma, organic light emitting diode, or other form of video display. Other regions of the display may present information relating to the status of the water softener, including salt depletion, salt level, whether the unit is currently undergoing regeneration, and the time and date of the next scheduled regeneration cycle.

The invention claimed is:

1. A method of communication within a network of a water treatment system, the water treatment system including a plurality of devices, the devices including at least one AC powered device and at least one battery powered device or battery operated device, the method comprising the steps of:
   continually checking, by a first AC powered device, the network for broadcasts by other devices;
   detecting, by the first AC powered device, a broadcast by another device;
   establishing, by the first AC powered device, a logical connection with the other device;
   receiving, by the first AC powered device, any request by the other device for data, the request including the identification of a data element, and the address of the device which relates to the data element, wherein the data includes a respective lifetime value; and
   receiving, by the first AC powered device, any data offered by the other device, the data including the identification of a data element, the data element value, and the identification of the device which originated the data element value, wherein the data includes a respective lifetime value; and
   waking up and requesting, by the battery operated device, updated data element values when any one data element value, as a result of the respective lifetime value being reduced as the data or request travels through the network, has less than a first pre-determined minimum of a maximum life time value, wherein the requesting is for all values resident in the battery operated device having a life time value less than a second pre-determined minimum of the maximum life time value, wherein the first pre-determined minimum is less than the second pre-determined minimum.

2. The method of claim 1, further comprising the steps of:
   caching, by the first AC device the request by the other device for the requested data;
   broadcasting, by the first AC device, a request for the requested data requested by the other device, the request of the first AC device including the identification of the data element, and the address of the device which relates to the data element; and
   receiving and caching, by the first AC device, the requested data provided by yet another device, the data including the identification of a data element, the data element value, and the identification of the device which originated the data element;
   receiving, by the first AC powered device, a further request by the other device for the requested data, the request including identification of a data element, and the address of the device which relates to the data element; and
   providing, by the first AC device, the requested data to the other device.

3. The method of claim 2, wherein the step of broadcasting, by the first AC device, a request, is part of a step of broadcasting, by the first AC device, a request for data based on previous data requests the first AC device received and cached.

4. The method of claim 2, wherein the step of broadcasting, by the first AC device, a request, is part of a step of broadcasting, by the first AC device, offering data previously received from another device and cached by the first AC device.

5. The method of claim 1, further comprising providing, by a device in the network which transmitted a particular data, information related to the quality of the data, receiving, by another device in the network, multiple copies of the data and quality information, including life time values, comparing the information related to the quality of the data, by the other device which received the data, selecting the data which has the greater quality of data.

6. The method of claim 5, further comprising requesting, by a device in the network, data from a specific device, receiving, by the device in the network, multiple copies of the data, and through multiple paths in the network.

7. The method of claim 5, wherein the information related to the quality of the data is the life time value.

8. The method of claim 5, wherein the information related to the quality of the data is a signal strength value of the data at the weakest point of travel through the network.

9. The method of claim 5, wherein the information related to the quality of the data is the life time value and a signal strength value of the data at the weakest point of travel through the network, and the step of selecting the data which has the greater quality of data includes selecting the data with the longer life time value, and in the event the life time values are the same, selecting the data which has the greatest signal strength value.

10. The method of claim 5, further comprising the steps of:
    receiving, by the AC device, multiple copies of the requested data from a plurality of respective devices; and
    identifying, by the AC device, the copy of the received data having a higher quality than the other copies of received data.

11. The method of claim 10, wherein the identifying step includes identifying the received data having the greatest life time remaining.

12. The method of claim 11, wherein the identifying step includes comparing the life time value of the multiple copies of the received data, and identifying the received data having the greater remaining life time.

13. The method of claim 12, wherein the identifying step includes identifying two or more received data having the same remaining life time, and identifying among the two or more received data, the received data having the higher quality signal level.

14. The method of claim 13, wherein the step of identifying the received data having the higher quality signal level includes comparing, for each received data, the signal strength of the weakest link the data traveled, and identifying the received data having the greater signal strength.

15. The method of claim 1, wherein the plurality of other devices includes a battery operated device, further comprising a step of periodically entering, by the battery operated device, a power conservation mode, periodically entering, by the battery operated device, a non-power conservation or active mode, and wherein the detecting step includes detecting, by the first AC powered device, a broadcast by a battery operated device during an active mode, and the first step of receiving any requests includes receiving, by the first AC powered device, any request by the battery operated device for data, the request including the identification of a data element, and the address of the device which relates to the data element, and the step of receiving any data includes receiving, by the first AC powered device, any data offered by the battery operated device, the data including the identification of a data element, the data element value, and the identification of the battery operated device.

16. The method of claim 1, wherein the plurality of devices includes a remote device, wherein the first step of receiving any request includes receiving, by the first AC powered device, any request by the remote device for data, the request including the identification of a data element, and the address of the device which relates to the data element, and the second step of receiving any data includes receiving, by the first AC powered device, any data offered by the remote device, the data including the identification of a data element value, the data element value and the identification of the remote operated device.

17. The method of claim 1, wherein the plurality of devices includes a second AC powered device, wherein the step of receiving any request includes receiving, by the first AC powered device, any request by the second AC powered device for data, the request including the identification of a data element, and the address of the device which relates to the data element, and the step of receiving any data includes receiving, by the first AC powered device, any data offered by the second AC powered device, the data including the identification of a data element, the data element value, and identification of the device which originated the data element value.

18. The method of claim 17, wherein the step of receiving any data includes receiving, by the first AC powered device, data offered by the second AC powered device, the data previously cached by the second AC powered device, the data including the identification of a data element, the data element value, and the identification of a third AC device which originated the data element value.

19. The method of claim 17, wherein the second step of receiving and data includes receiving, by the first AC powered device, data offered by the second AC powered device, the data previously cached by the second AC powered device, the data including the identification of a data element, the data element value, and identification of a battery operated device which originated the data element value.

20. The method of claim 17, wherein the step of receiving any data includes receiving, by the first AC powered device, data offered by the second AC powered device, the data previously cached by the second AC powered device, the data including the identification of a data element, the data element value, and identification of a remote device which originated the data element value.

21. The method of claim 1, wherein the data further having a signal strength value.

22. The method of claim 21, wherein the life time value includes a first part and a second part, the first part including the lower 15 bits of data to provide a maximum of 9 hours in one second increments, and the second part is the most significant bit to provide a remote control flag which is set to one by a remote to indicate that the associated data element value has been updated by a remote.

23. The method of claim 21, further comprising setting the life time value to a maximum value when the respective data or request is newly transmitted by the respective device.

24. The method of claim 21, wherein the life time value is periodically reduced, in particular, wherein AC powered devices reduce the life time value of cached data element value or request every second.

25. The method of claim 1, wherein the first pre-determined minimum is one-quarter of the maximum life time value, and the second pre-determined minimum is one-half of the maximum life time value.

26. The method of claim 25, wherein the step of waking up and requesting does not include data element values wherein the related life time value has reached zero without any request of the data element value by other devices.

27. The method of claim 1, further comprising periodically initiating a wake up routine by a battery operated device to broadcast to the network, requesting data, by the battery operated device, the request including the identification of the battery operated device, the identification of a data element, and the address of the data element; and providing data, by the battery operated device, the data including the identification of a data element, the data element value, and the identification of the battery operated device which originated the data element.

28. The method of claim 27, further comprising broadcasting, by the AC powered device, after communicating with a battery powered device, the AC powered device data and the data cached by the AC powered device.

29. The method of claim 28, wherein the AC powered device will broadcast a cached request for data if the request has a greater life time value than a corresponding cached data.

30. The method of claim 1, further comprising broadcasting, by the AC powered device, on a periodic basis, the AC powered device data and the data cached by the AC powered device.

* * * * *